United States Patent
Arndt et al.

(10) Patent No.: US 7,681,083 B2
(45) Date of Patent: *Mar. 16, 2010

(54) ISOLATION OF INPUT/OUTPUT ADAPTER ERROR DOMAINS

(75) Inventors: Richard L. Arndt, Austin, TX (US); Patrick A. Buckland, Austin, TX (US); Gregory M. Nordstrom, Pine Island, MN (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,955

(22) Filed: Apr. 18, 2008

(65) Prior Publication Data

US 2008/0189577 A1 Aug. 7, 2008

Related U.S. Application Data

(63) Continuation of application No. 10/887,524, filed on Jul. 8, 2004, now Pat. No. 7,398,427.

(51) Int. Cl.
*G06F 11/00* (2006.01)
(52) U.S. Cl. .......................................... 714/43; 714/56
(58) Field of Classification Search ........................ None
See application file for complete search history.

(56) References Cited

U.S. PATENT DOCUMENTS

| | | | |
|---|---|---|---|
| 5,640,584 A | 6/1997 | Kandasamy et al. | |
| 5,771,387 A | 6/1998 | Young et al. | |
| 6,081,861 A | 6/2000 | Kelley et al. | |
| 6,219,743 B1 | 4/2001 | Kennel et al. | |
| 6,523,140 B1 | 2/2003 | Arndt et al. | |
| 6,629,157 B1 | 9/2003 | Falardeau | |
| 6,643,727 B1 | 11/2003 | Arndt et al. | |
| 6,691,192 B2 | 2/2004 | Ajanovic et al. | |
| 6,823,404 B2 | 11/2004 | Arndt et al. | |
| 2002/0010811 A1 | 1/2002 | Arndt et al. | |
| 2003/0172322 A1 | 9/2003 | Kitamorn et al. | |
| 2004/0153853 A1 | 8/2004 | Moriki et al. | |
| 2004/0225792 A1 | 11/2004 | Garnett | |
| 2004/0260981 A1 | 12/2004 | Kitamorn et al. | |
| 2005/0081126 A1 | 4/2005 | Kulkarni et al. | |
| 2006/0010276 A1 | 1/2006 | Arndt et al. | |
| 2006/0010277 A1 | 1/2006 | Arndt et al. | |

OTHER PUBLICATIONS

Fetzer et al., "A Highly Available Local Leader Election Service", IEEE Transactions on Software Engineering, vol. 25, No. 5, Sep./Oct. 1999, pp. 603-618 http://ieeexplore.ieee.org/search/wrapper.jsp?arnumber_815321.

*Primary Examiner*—Yolanda L Wilson
(74) *Attorney, Agent, or Firm*—Yee & Associates, P.C.; Diana R. Gerhardt (57) ABSTRACT

Method, apparatus and system for isolating input/output adapter error domains in a data processing system. Errors occurring in one input/output adapter are isolated from other input/output adapters of the data processing system by functionality in a host bridge that connects the input/output adapters to a system bus of the data processing system, thus permitting the use of low cost, industry standard switches and bridges external to the host bridge.

8 Claims, 9 Drawing Sheets

ISOLATION OF INPUT/OUTPUT ADAPTER ERROR DOMAINS

CROSS REFERENCE TO RELATED APPLICATIONS

The application is a continuation of application Ser. No. 10/887,524, filed Jul. 8, 2004, status now U.S. Pat. No. 7,398,427.

BACKGROUND OF THE INVENTION

1. Technical Field

The present invention relates generally to the data processing field and, more particularly, to a method, apparatus and system for isolating input/output adapter error domains in a data processing system.

2. Description of Related Art

In a server environment, it is important to be able to isolate input/output adapters (IOAs) so that an IOA can only obtain access to the resources which are allocated to it. Isolating IOAs from one another is important to create a system that is robust from a reliability and availability standpoint, and is especially important in a logical partitioned (LPAR) data processing system, so that IOAs, or parts of IOAs, can be allocated on an individual basis to different LPAR partitions.

In particular, in an LPAR data processing system, multiple operating systems or multiple copies of a single operating system are run on a single data processing system platform. Each operating system or operating system copy executing within the data processing system is assigned to a different logical partition, and each partition is allocated a non-overlapping subset of the resources of the platform. Thus, each operating system or operating system copy directly controls a distinct set of allocatable resources within the platform.

Among the platform resources that may be allocated to different partitions in an LPAR data processing system include regions of system memory and IOAs or parts of IOAs. Thus, different regions of system memory and different IOAs or parts of IOAs may be assigned to different partitions of the system. In such an environment, it is important that the platform provide a mechanism to enable an error occurring as a result of an operation with an IOA to be isolated to the particular partition to which the IOA is assigned. For example, for peripheral component interconnect (PCI) busses, if one IOA activates the System Error (SERR) signal on the bus, it is indistinguishable as to which IOA activated the signal since it is a shared signal. In such a situation where the error is not isolated, the system hardware must ensure that all partitions see the same error; and this requirement is contrary to the definition and intent of logical partitioning.

One solution that addresses the PCI problem is to assign all IOAs under one PCI Host Bridge (PHB) to the same LPAR partition. However, doing so results in a granularity that is not very usable. Ideally, a user should be able to assign IOAs to different partitions regardless of which PHB the IOA falls under.

Currently, error isolation between IOAs is accomplished by using unique, specially designed bridge chips that are located externally of the PCI Host Bridge (PHB). These external bridge chips include Enhanced Error Handling (EEH) technology (see, for example, commonly assigned application entitled "ISOLATION OF I/O BUS ERRORS TO A SINGLE PARTITION IN AN LPAR ENVIRONMENT", Ser. No. 09/589,664), which is effective in preventing errors generated by one IOA from affecting partitions other than the partition to which the IOA is assigned. Such unique bridge chips, however, are relatively expensive and preclude the use of less costly, industry standard bridges in the data processing system.

It would, accordingly, be advantageous to provide for isolation of input/output adapter error domains in a data processing system without requiring the use of expensive, unique bridge chips.

SUMMARY OF THE INVENTION

The present invention provides a method, apparatus and system for isolating input/output adapter error domains in a data processing system. Errors occurring in one input/output adapter are isolated from other input/output adapters of the data processing system by functionality in a host bridge that connects the input/output adapters to a system bus of the data processing system, thus permitting the use of low cost, industry standard switches and bridges external to the host bridge.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
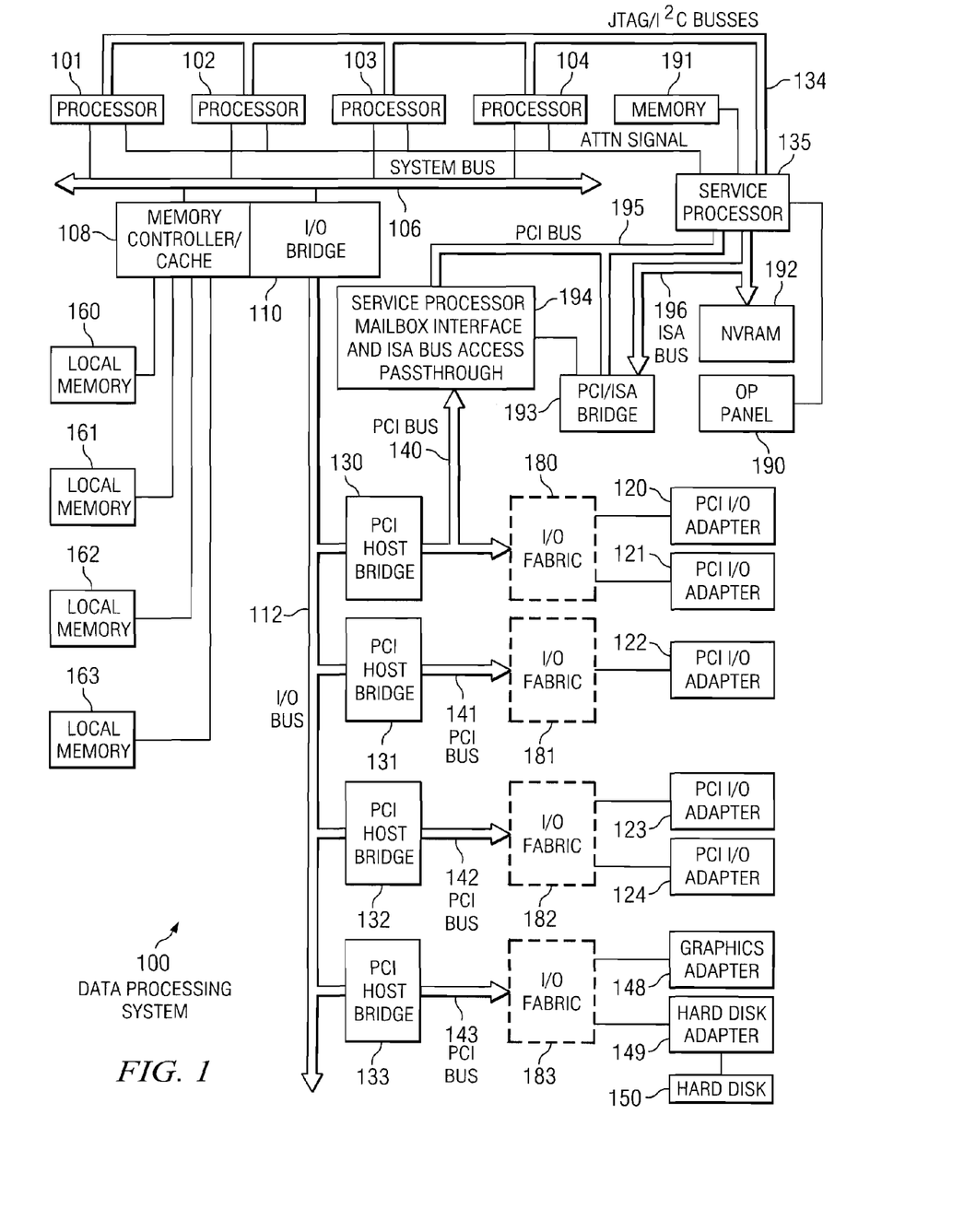
FIG. 1 is a block diagram of a data processing system in which the present invention may be implemented.

With reference now to the figures, FIG. 1, depicts a block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system, however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI input/output adapters (IOAs) 120, 121, 122, 123 and 124, graphics adapter 148 and hard disk adapter 149, or parts thereof, may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 is assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123 and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different logical partition. Thus, each operating system executing within data processing system 100 may access only those IOAs that are within its logical partition. For example, one instance of the Advanced Interactive Executive (AIX) operating system may be executing within partition P1, a second instance (copy) of the AIX operating system may be executing within partition P2, and a Linux or OS/400 operating system may be operating within logical partition P3.

Peripheral component interconnect (PCI) host bridges (PHBS) 130, 131, 132 and 133 are connected to I/O bus 112 and provide interfaces to PCI local busses 140, 141, 142 and 143, respectively. PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. The I/O fabrics 180-183 provide interfaces to PCI busses 140-143 and will be described in greater detail hereinafter. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. This PCI bus also connects PCI host bridge 130 to service processor mailbox interface and ISA bus access pass-through logic 194 and I/O fabric 180. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs) IPLs are also sometimes referred to as a "boot" or "bootstrap".

Data processing system 100 may be implemented using various commercially available computer systems. For example, data processing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
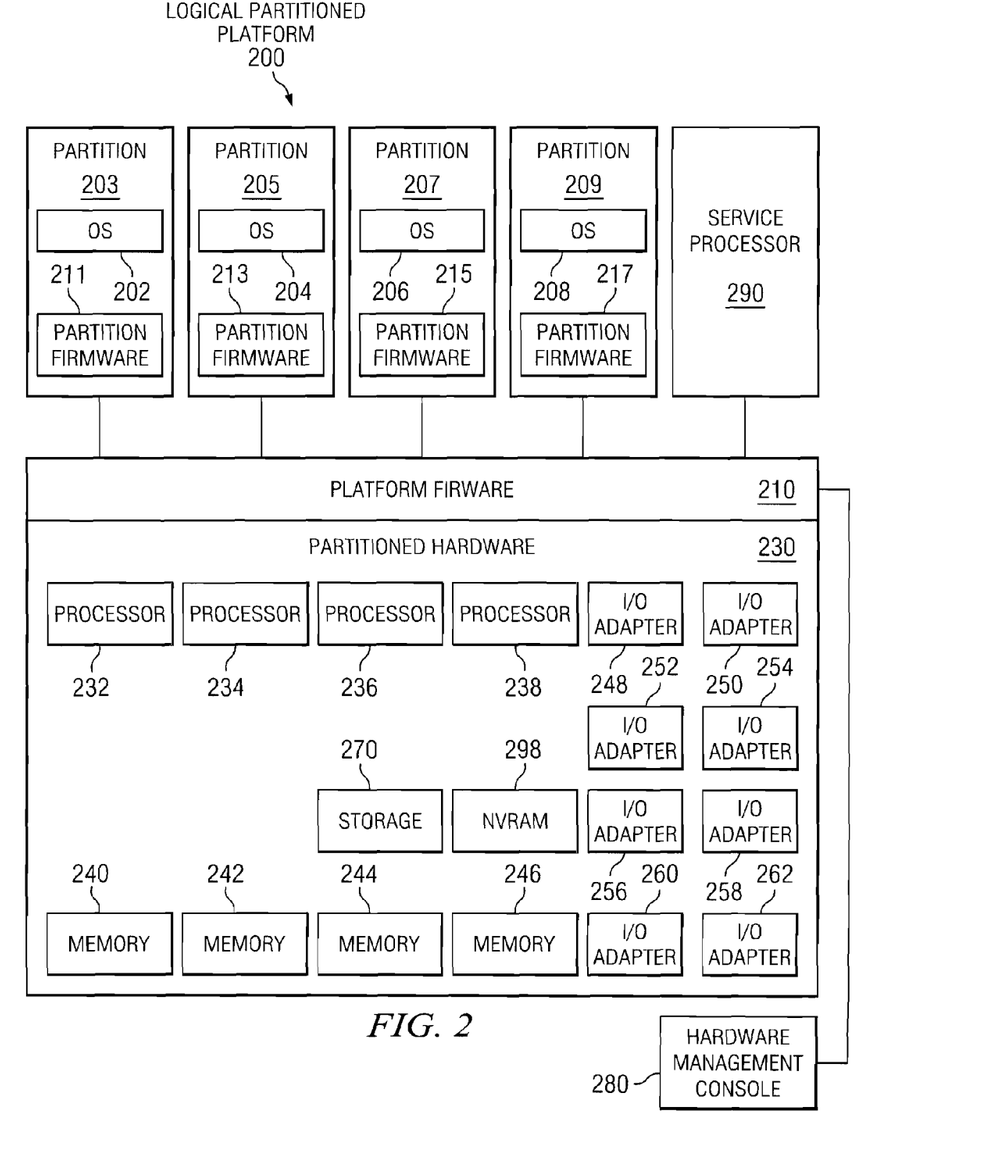
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Other types of operating systems, such as AIX and Linux, may also be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, and a storage unit 270. Each of the processors 232-238, memory units 240-246, NVRAM storage 298, and IOAs 248-262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In an LPAR environment, it is not permissible for resources or programs in one partition to affect operations in another partition. Furthermore, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
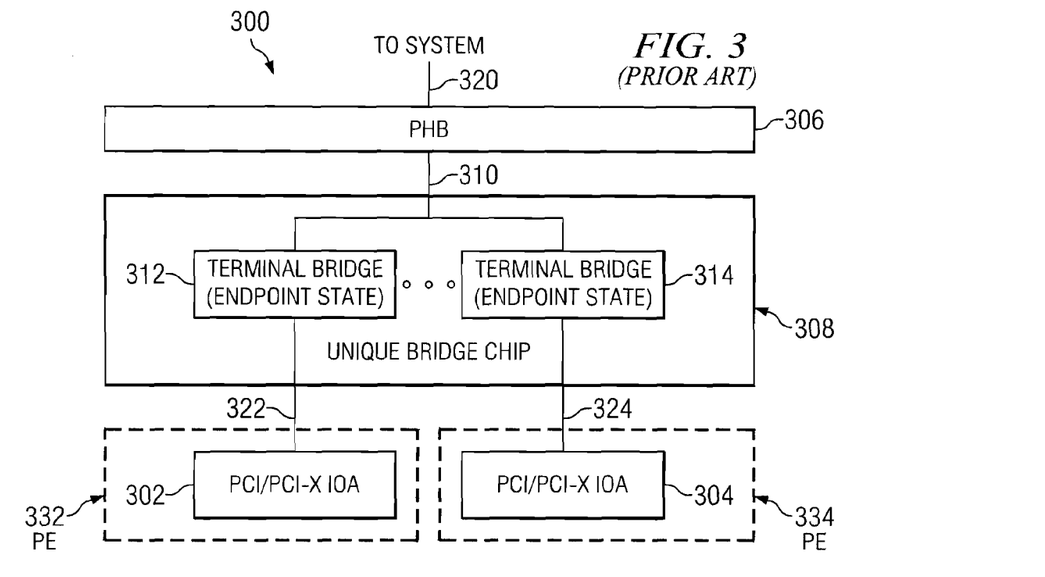
FIG. 3 is a block diagram that illustrates a known system for providing resource isolation in a data processing system to assist in explaining the present invention.

FIG. 3 is a block diagram that illustrates a known system for providing resource isolation in a data processing system to assist in explaining the present invention. The system is generally designated by reference number 300, and includes a plurality of IOAs, for example, IOAs 302 and 304. IOAs 302 and 304 are connected to PHB 306 of a data processing system, such as data processing system 100 illustrated in FIG. 1, through a bridge structure that comprises unique, specially designed bridge chip 308. Bridge chip 308 is connected to PHB 306 by PCI local bus 310, and PHB 306 is, in turn, ultimately connected to a system bus, such as system bus 106 in FIG. 1, possibly as through I/O bus 112 and I/O bridge 110 in FIG. 1, and to other components of the data processing system as represented at 320.

Unique bridge chip 308 includes a terminal bridge for each IOA. In particular, IOA 302 is connected to terminal bridge 312 by PCI bus 322, and IOA 304 is connected to terminal bridge 314 by PCI bus 324. Terminal bridges 312 and 314 contain endpoint states of IOAs 302 and 304, respectively, and serve to isolate IOAs 302 and 304 from one another.

In resource isolation system 300 illustrated in FIG. 3, IOAs 302 and 304 comprise input/output units that are capable of being isolated from one another in unique bridge chip 308; and, therefore, can, for example, be assigned to different partitions of an LPAR data processing system. An input/output unit that can be isolated from other input/output units of a data processing system and that can be separately assigned to different partitions of an LPAR data processing system is referred to herein as a "Partitionable Endpoint" or a "PE". A PE, as used herein, is defined as being any part of an I/O subsystem that can be assigned to a partition independent of any other part of the I/O subsystem. Thus, in resource isolation system 300 in FIG. 3, each IOA 302 and 304 can also be considered as PEs 332 and 334, respectively.

As will become apparent hereinafter, a PE as defined herein also comprises an input/output unit that is something more or something less than a single IOA. For example, a PE also comprises a plurality of IOAs that function together and, thus, that should be assigned as a unit to a single partition. A PE can also comprise a portion of a single IOA, for example, two ports of a chip that perform as separately configurable functions. If the two ports provide separate functions, they are capable of being separately assigned to different partitions; and, thus, each port may be defined as a separate PE. In general, a PE is defined by its function rather than by its structure.

The present invention utilizes the concept of a PE to provide a resource isolation system in which the isolation functionality is moved from a unique bridge chip located externally of the PHB, such as in system 300 in FIG. 3, to the PHB itself.

Figure 4:
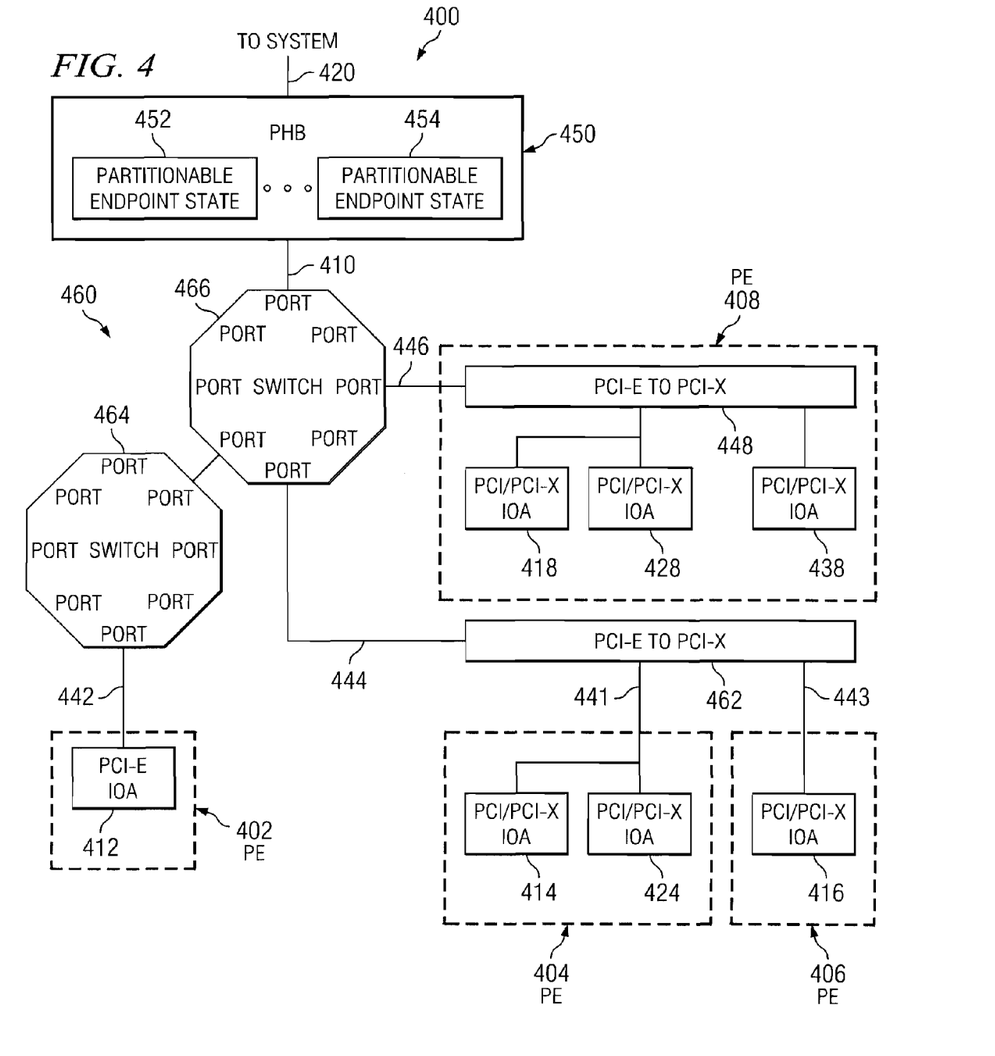
FIG. 4 is a block diagram that illustrates a system for providing resource isolation in a data processing system in accordance with a preferred embodiment of the present invention.

In particular, FIG. 4 is a block diagram that illustrates a system for providing resource isolation in a data processing system in accordance with a preferred embodiment of the present invention. The system is generally designated by reference number 400, and comprises a plurality of PEs 402, 404, 406 and 408 that are capable of being assigned to different partitions of an LPAR data processing system. PEs 402, 404, 406 and 408 are each connected to PHB 450 by an I/O fabric that is generally designated by reference number 460.

I/O fabric 460 includes PCI bridge 462 and switches 464 and 466, and is connected to PHB 450 by local PCI bus 410 that connects switch 466 to PHB 450, and to PEs 402, 404, 406 and 408 by various secondary busses. As shown in FIG. 4, PCI busses 410, 442, 444, and 446 PE 402 are PCI-Express (PCI-E) links. In particular, as shown in FIG. 4, PE 402 is connected to PHB 450 by secondary bus 442, switches 464 and 466 and local bus 410. PE 404 is connected to PHB 450 by secondary bus 441, PCI bridge 462, secondary bus 444, switch 466, and local bus 410. PE 406 is connected to PHB 450 by secondary bus 443, PCI bridge 462, secondary bus 444, switch 466, and local bus 410. PE 408 is connected to PHB 450 by local bus 446, switch 466 and local bus 410.

It should be understood that the specific configuration of I/O fabric 460 illustrated in FIG. 4 is intended to be exemplary only. The I/O fabric can be assembled in any appropriate manner using any suitable arrangement of busses, bridges and switches. Also, it should be understood that one or more of PEs 402, 404, 406 and 408 can be connected directly to PHB 450 rather than being connected to PHB 450 through I/O fabric 460 as shown in FIG. 4.

PE 402 and PE 406 each comprises a single IOA 412 and 416, respectively, such that IOAs 412 and 416 can each be assigned to a different partition of the data processing system. PE 404 comprises two IOAs 414 and 424 that function together and, thus, must be assigned to the same partition. PE 408 comprises three IOAs 418, 428 and 438 and bridge 448 that function together and must be assigned to the same partition.

In isolation system 400, the endpoint states of each PE, referred to herein as Partitionable Endpoint states, are located in PHB 450 in the illustrated example rather than in a unique bridge chip as in system 300 illustrated in FIG. 3. As a result, in system 400, I/O fabric 460 can be assembled using inexpensive, industry standard switch and bridge chips, thus permitting a reduction in the overall cost of the data processing system while retaining all required isolation functions.

The ability to move the isolation functionality from a unique bridge chip to the PHB is achieved, in part, by providing a PE Domain Number that associates various domain components to the same PE. The PE Domain Number is an identifier that includes a plurality of fields that can be used to differentiate different IOAs in a PE. These fields include:

Bus number (Bus) field—the highest level of division. Each bus under a PHB has a unique bus number.

Device number (Dev) field within the Bus number—the next level of division. Each IOA on a bus has a different device number.

Function number (Func) field within the Device number—the lowest level of division. Each function of an IOA has a different function number (multiple function IOAs have multiple function numbers, and single function IOAs have one function number).

The PE Domain number (Bus/Dev/Func number), allows for division down to the lowest level of division i.e., use of all of the Bus/Dev/Func fields allows separate functions of a multiple function IOA to be differentiated. In isolation systems that do not require such a fine granularity, the PE Domain number can be defined by the Bus field alone, allowing differentiation between the PEs connected to the PHB, or by the Bus field together with either the Dev field or the Func field to permit differentiation between IOAs of a PE or differentiation between functions of an IOA in a PE that contains a multiple function IOA.

Among the isolation functionalities included in PHB 450 in FIG. 4 is a functionality to isolate PE error domains. For example, in an LPAR data processing system, different PEs may be assigned to different partitions of the system. In such an environment, the PHB must provide a functionality to enable an error occurring in one PE to be isolated to the particular partition to which the PE is assigned.

More particularly, the PHB should include, for example by utilizing EEH technology, the capability of stopping operations to and from a PE when an error is detected (referred to as the Stopped State). The stopping of operations should be accomplished in such a way that:

1. The PE is prevented from completing an I/O operation in error,
    a. in such a way that the PE does not propagate an error to any partition, and
    b. in such a way that a requester of the I/O operation does not use bad data.
2. The stopping of operations should appear to a Device Driver (DD) to be isolated to just that DD.
3. Software (at the DD level or above) for one PE must not be able to introduce an error that can cause another PE to enter the Stopped State.
4. The capturing of fault information for problem determination must be allowed after the Stopped State condition occurs.
5. Firmware must have access to the configuration space below the PHB when any or all of the PEs are in the Stopped State.

In order to achieve these objectives, the error isolation system of the present invention includes mechanisms in the PHB that provide the following isolation functionalities:

1. a functionality to use address bits of an MMIO (Memory Mapped I/O) to look up a PE Number in an MMIO Domain Table;
2. a functionality to use a PE Domain Number of a DMA (Direct Memory Access) operation to associate a DMA operation with a PE Number;
3. a functionality to lookup the error domain state by use of the PE Number in each MMIO and DMA operation;

4. a functionality to set the error domain state to a Stopped State on any MMIO or DMA operation error associated with the error domain;
5. a functionality to prevent the propagation of any MMIO or DMA operation if its error domain is in the Stopped State; and
6. a functionality to prevent an error from affecting other error domains.

The above isolation functionalities are enabled by providing a PE State Array in the PHB. The PE State Array is accessed by the PE Number which is obtained from the PE Number field of an MMIO Domain Entry (MDE), a Translation Validation Entry (TVE) or an MSI Validation Entry (MVE) for MMIO Load/Store, normal DMA and MSI operations, respectively. When a DMA operation (normal or MSI) does not have its Bus/Dev/Func validate in the TVE or MVE, or when an ERR_FATAL or ERR_NONFATAL comes in from the I/O fabric, then a PE Lookup Table (PELT) is used to lookup all possible PE Numbers that could be in the same error domain as the Bus/Dev/Func. When the PELT is used, and the Bus/Dev/Func is not found, then the hardware assumes that all PE numbers under the PHB are affected.

Figure 5:
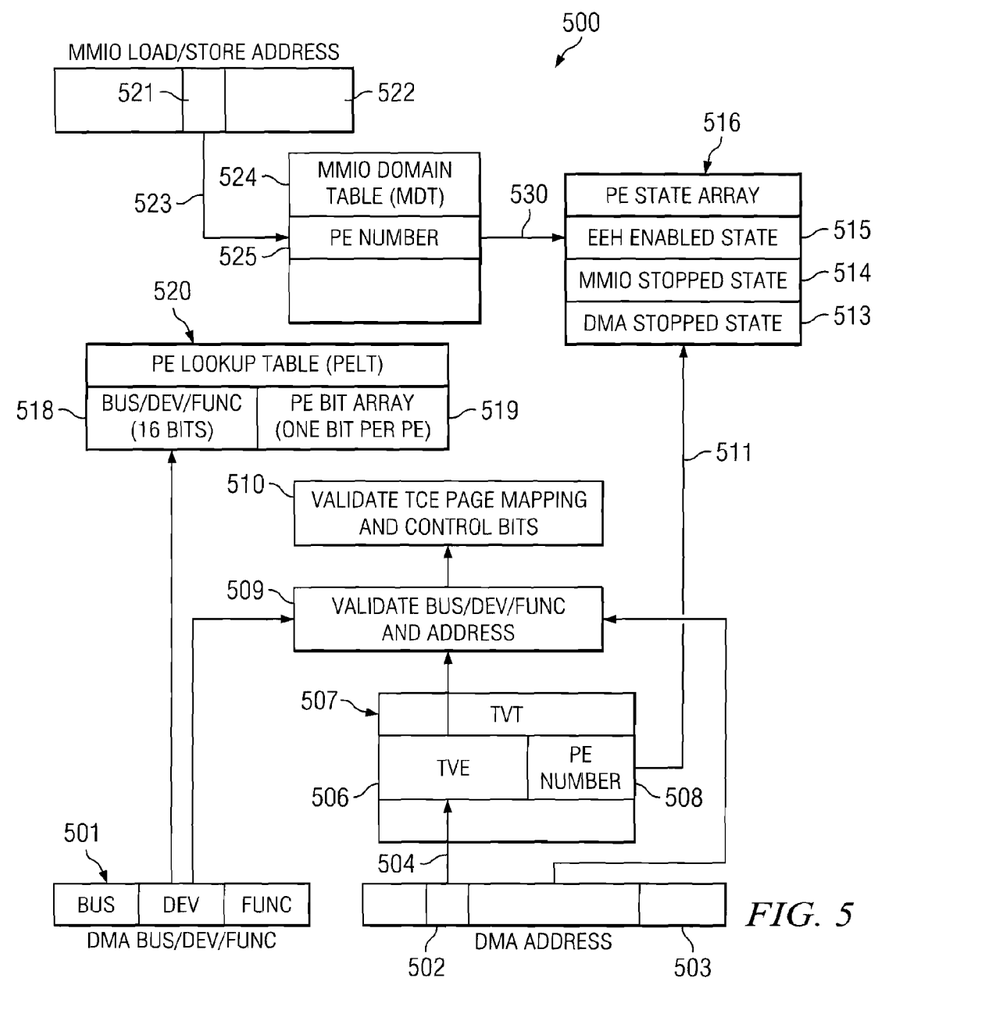
FIG. 5 is a conceptual flow diagram that illustrates an operation for isolating input/output unit error domains in a data processing system in accordance with a preferred embodiment of the present invention.

FIG. 5 is a conceptual flow diagram that illustrates an operation for isolating input/output unit error domains in a data processing system in accordance with a preferred embodiment of the present invention. The operation is generally designated by reference number 500, and includes operations for validation and PE correlation for MMIO Load/Store operations, for normal DMA operations, and for MSI DMA operations.

Validation and PE correlation for MMIO Load/Store operations begins by using an MDE Index 521 which comprises certain bits of an MMIO Load and Store address 522, to lookup the PE Number 525 in MMIO Domain Table 524 in the PHB, as shown by arrow 523. Those skilled in the art will recognize that there are other ways to get an index into a table based on an address, such as base and bounds registers, base and extent registers, and so on. The PE Number is then used to access the PE State Array 516 as shown by arrow 530.

If the PE State Array indicates that an MMIO Stopped State for the PE is not set, the MMIO operation is allowed to continue. If there is an error during completion of the MMIO operation, the MMIO Stopped State is set as shown at 514, and the DMA Stopped State for the PE Number is set as shown at 513, and the operation is not allowed to continue.

If the PE State in the PE State Array indicates that the MMIO Stopped State for the PE is set, then on an MMIO Store, the data is discarded (no error signaled); and on an MMIO Load, the operation is completed with all-1's data returned. If EEH is enabled, as indicated at 515 in the PE State Array 516, for the PE Number which is the target of the MMIO, then an error is not signaled, and in that case, it is up to the device driver to recognize that all-1's may mean that an error occurred, and to run a program to determine if the all-1's is good data or not. If the EEH is not enabled for the PE Number which is the target for the MMIO, then a machine check is signaled to the processor that issued the Load.

Validation and PE Correlation for Normal DMA Read/Write operations begins with the DMA address 503 and the Bus/Dev/Func number 501 coming in on the I/O bus. The Bus/Dev/Func number uniquely identifies the PE requesting the operation. A specific TVE is selected by the address provided by the I/O operation, which comprises the PE Domain Number and the bus address. Those skilled in the art will recognize that there are several ways to get from this address provided by the PE to a unique entry in the TVT. For example, certain bits of the I/O bus address bits may be used to index into the TVT as follows: TVE Index bits 502 are used to access TVE 506 in TVT (Translation Validation Table) 507 as shown by arrow 504. The TVE contains a Bus number field and a Bus number Validate field. Optionally, it may also include Device number field and a Device number Validate field and/or a Function number field and a Function number Validate field, all of which are used to determine if the Bus/Dev/Func number 501 coming in with the transaction has valid access to the TVE that it is trying to access.

If the Bus/Dev/Func compares for the operation as shown at 509, then the address 503 is compared against Translation Control Entry (TCE) Table Size (Address Size) field of TVE 506 as shown at 509, to determine if the address is valid. (The TCE is used to translate an I/O address page number to a Real Page Number in system memory.) If it is not valid, PE Number 508 from the TVE is used to lookup the PE state in the PE State Array, the Stopped State for the PE (MMIO and DMA) are set, and the operation is aborted. If valid, then PE Number 508 from the TVE is used to lookup the DMA Stopped State in the PE State Array to see if the PE Number is already in the DMA Stopped State. While the PE Number is in the DMA Stopped State, all DMA operations for the PE Number are prohibited and will be aborted. While the PE Number is not in the DMA Stopped State, DMA operations for the PE Number will be allowed.

The PELT is used when there is no other valid way to get an association between a failed operation and the PE Number or PE Numbers associated with the failure. That is, if there is no valid TVE or MVE associated with an operation, or if a fatal or non-fatal error message is received by the PHB from the I/O bus.

The PELT lookup is done as follows:

The PELT 520 is scanned for an entry where the Bus/Dev/Func number 518 of the PELT entry compares to the Bus/Dev/Func number 501 from the incoming PE Number (for errors, the Bus/Dev/Func number is in the ERR_FATAL or ERR_NONFATAL message, and for DMA operations that do not verify in the TVT, the Bus/Dev/Func number is in the DMA packet). The scan of the PELT may be performed by any method that performs well enough to prevent side error effects. Specifically, the MMIO and DMA queues/pipelines must be held up momentarily during the scan, so that operations affected by the lookup can be terminated, and thus stalling of pipelines must not cause additional errors in the PHB or other chips. Also, the PELT entries may have validation fields just like the TVEs, allowing the comparison of less than the full Bus/Dev/Func number.

If an entry is found in the PELT which matches the Bus/Dev/Func, then the PE Bit Array 519 field of the PELT entry specifies the PE Number or Numbers that are in the error domain for this Bus/Dev/Func number, and these are used to access the PE State Array 516 and set the appropriate MMIO stopped states 514 and DMA Stopped States 513.

For ERR_FATAL or ERR_NONFATAL, Bus/Dev/Func lookup, both the MMIO Stopped State and DMA Stopped State are set for all the PELT-specified PEs, regardless of their current state (the ERR_FATAL and ERR_NONFATAL may be from any fabric error and any operation, including an MMIO failure).

For the case where the PELT lookup is due to an invalid Bus/Dev/Func validation from the MVE or TVE validation process, for any given PE, if the DMA Stopped State is already set for the PE, then leave the MMIO and DMA Stopped States for the PE as-is, otherwise (DMA Stopped State not set) set the MMIO and DMA Stopped States for the PE.

Figure 6:
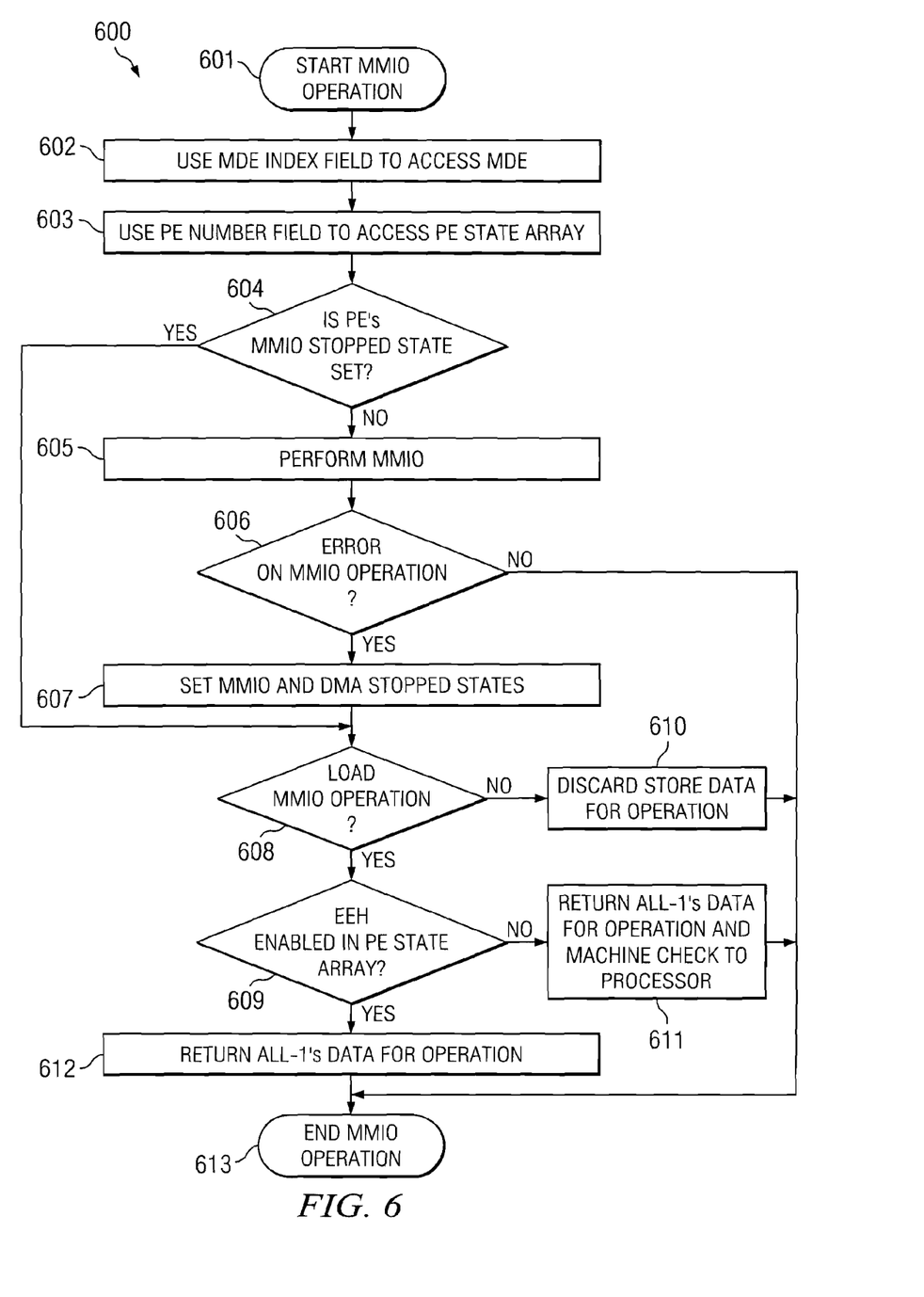
FIG. 6 is a flowchart that illustrates a method for isolating input/output unit error domains in a Memory Mapped Input/Output (MMIO) operation in accordance with a preferred embodiment of the present invention.

FIG. 6 is a flowchart that illustrates a method for isolating input/output unit error domains in an MMIO operation in accordance with a preferred embodiment of the present invention. The method is generally designated by reference number 600 and begins with the start of an MMIO operation (step 601). The MDE index (the field in the MMIO address used to index into the MDT to get the MDE) is used to look up the MDE (step 602). The PE Number field in the MDT is then used to access the PE State Array (step 603).

A determination is then made as to whether the PE state in the PE State Array indicates that the MMIO Stopped state for the PE is set (step 604). If it is set (Yes output of step 604), continue at error processing (step 608). If it is not set (No output of step 604), the MMIO operation is performed (step 605).

A determination is then made as to whether there was an error in performing the MMIO operation (step 606). If there was no error during completion of the MMIO operation (No output of step 606), the operation ends (step 613). If there was an error (Yes output of step 606), the MMIO Stopped State and the DMA Stopped State for the PE Number are set (step 607), and error processing is continued.

A determination is then made as to whether the operation is an MMIO Load or Store operation (step 608). If the operation is a Store (No output of step 608), then discard the Store data (step 610) and the operation ends (step 613).

If the operation is a Load (Yes output of step 608), a determination is made as to whether or not EEH is enabled in the PE State Table for the PE Number (step 609). If the EEH is not enabled for the PE Number (No output of step 609), then the operation is completed with all-1's data returned and a machine check to the processor that issued the Load (step 611). If EEH is enabled for the PE (Yes output of step 609), then the operation is completed with all-1's data returned with no error signaled (step 612). After completing step 611 or 612, the MMIO operation is complete and ends (step 613).

Figure 7:
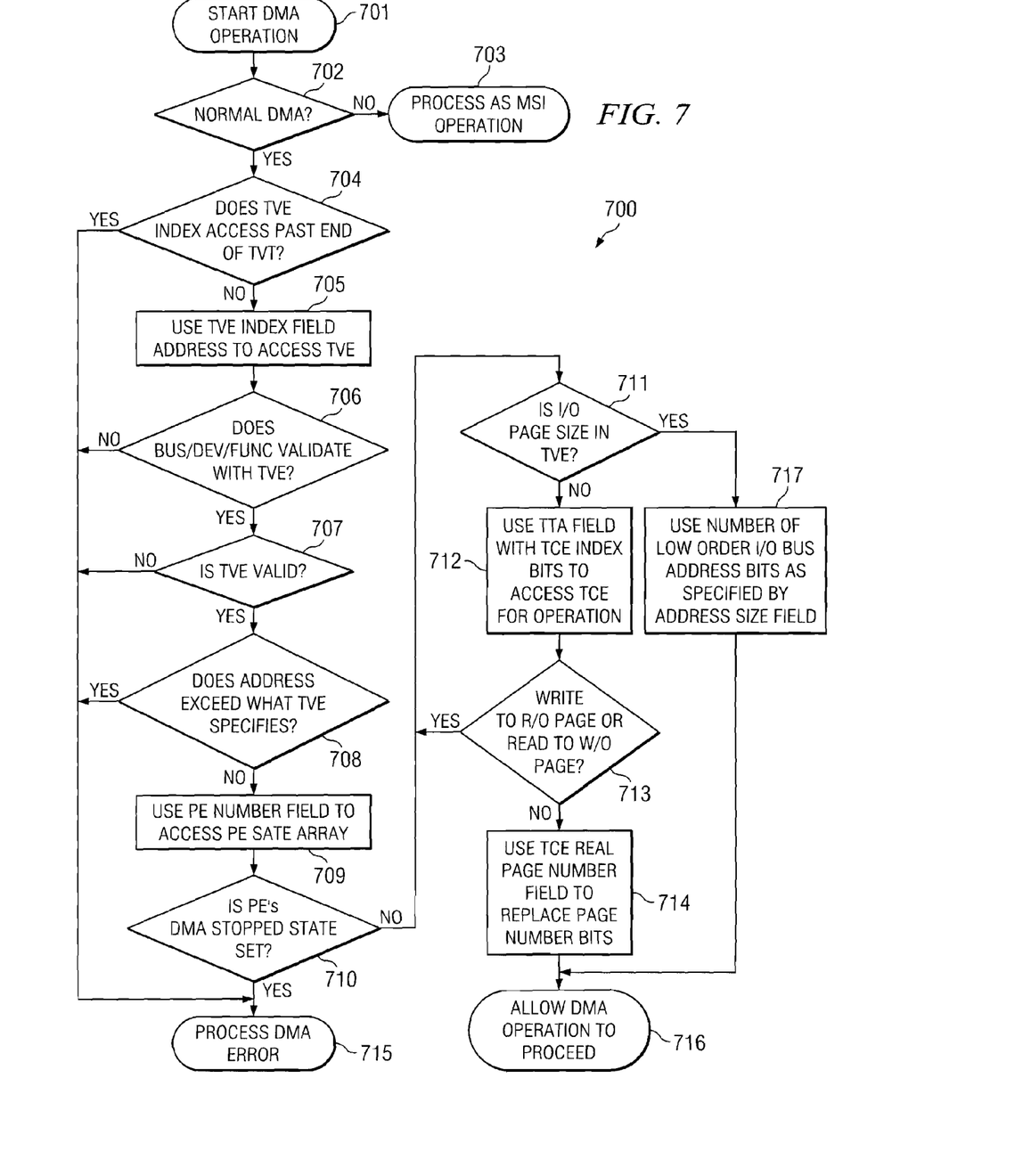
FIG. 7 is a flowchart that illustrates a method for isolating input/output unit error domains in a non-Message Signaled Interrupt (MSI) Direct Memory Access (DMA) operation in accordance with a preferred embodiment of the present invention.

FIG. 7 is a flowchart illustrating a method for isolating input/output unit error domains in a non-Message Signaled Interrupt (MSI) Direct Memory Access (DMA) operation in accordance with a preferred embodiment of the present invention. The method is generally designated by reference number 700, and begins with the start of a DMA operation (step 701).

A determination is made as to whether this is a DMA operation or an MSI operation (step 702). This determination is made, for example, by looking at a particular bit in the DMA address. A zero is a normal DMA and a one is an MSI operation. If it is an MSI operation (No output of step 702), it is processed as an MSI operation (step 703).

If it is a DMA operation (Yes output of step 702), it is determined if the TVE index accesses past the end of the TVT (step 704). If so (Yes output of step 704) error processing is performed (step 715). If not (No output of step 704), the TVE Index Field address is used to access the TVE (step 705). A determination is then made if the Bus/Dev/Func number validates with the TVE (step 706) If it does not validate (No output of step 706), error handling is performed (step 715). If it does validate (Yes output of step 706), a determination is made whether the TVE is valid (step 707). If not valid (No output of step 707), error handling is performed (step 715). If the TVE is valid (Yes output of step 707), the address is then checked to see if it exceeds what the TVE says is valid (step 708). This is done by using the TVE Table Size (Address Size) field to determine how many of the high-order bits of the TCE Index field of the DMA address have to be zero. If the address is too large, the access is not valid (Yes output of step 708) and error handling is performed (step 715). If the TCE Table Size is zero, then the address will always be deemed to be invalid, so a value of zero can be used to mark the TVE as invalid with a good Bus/Dev/Func validation. If the access is valid (No output of step 708), the PE Number field from the TVE is used to access the PE State Array (step 709). A determination is then made as to whether or mot the PE Number has its Stopped State set (step 710). If not (No output of step 710), continue. If the state is set (Yes output of step 710) error handling is performed (step 715).

The I/O page size field in the TVE is then checked to see if it is zero (step 711). If so (Yes output of step 711), the TCE access and address translation is by-passed using the number of low order address bits from the I/O bus address as specified by the TCE Table Size (Address Size) field, and appending on the appropriate number of TVE TCE Table Address (TTA) field low-order bits as the high-order bits of the real address to create enough bits to address the entire address range supported by the implementation (step 717), and the operation is allowed to continue (step 716).

If the I/O Page Size field in the TVE is not zero (No output of step 711), then the TTA field of the TVE is used along with the TCE Index bits of the DMA address to access the TCE for the operation (step 712).

A comparison is made with the type of DMA operation (read or write) to the TCE Page Mapping and Control field of the TCE (step 713). If the type of operation does not match, or if the Page Mapping and Control field indicates a page fault (Yes output of step 717), error handling is performed (step 715).

If the operation does match (No output of step 713), the Real Page Number field of the TCE is used along with the Page Offset field of the incoming DMA address to construct the physical address to be used to access system memory (step 714), and the operation is allowed to continue (step 716).

Figure 8:
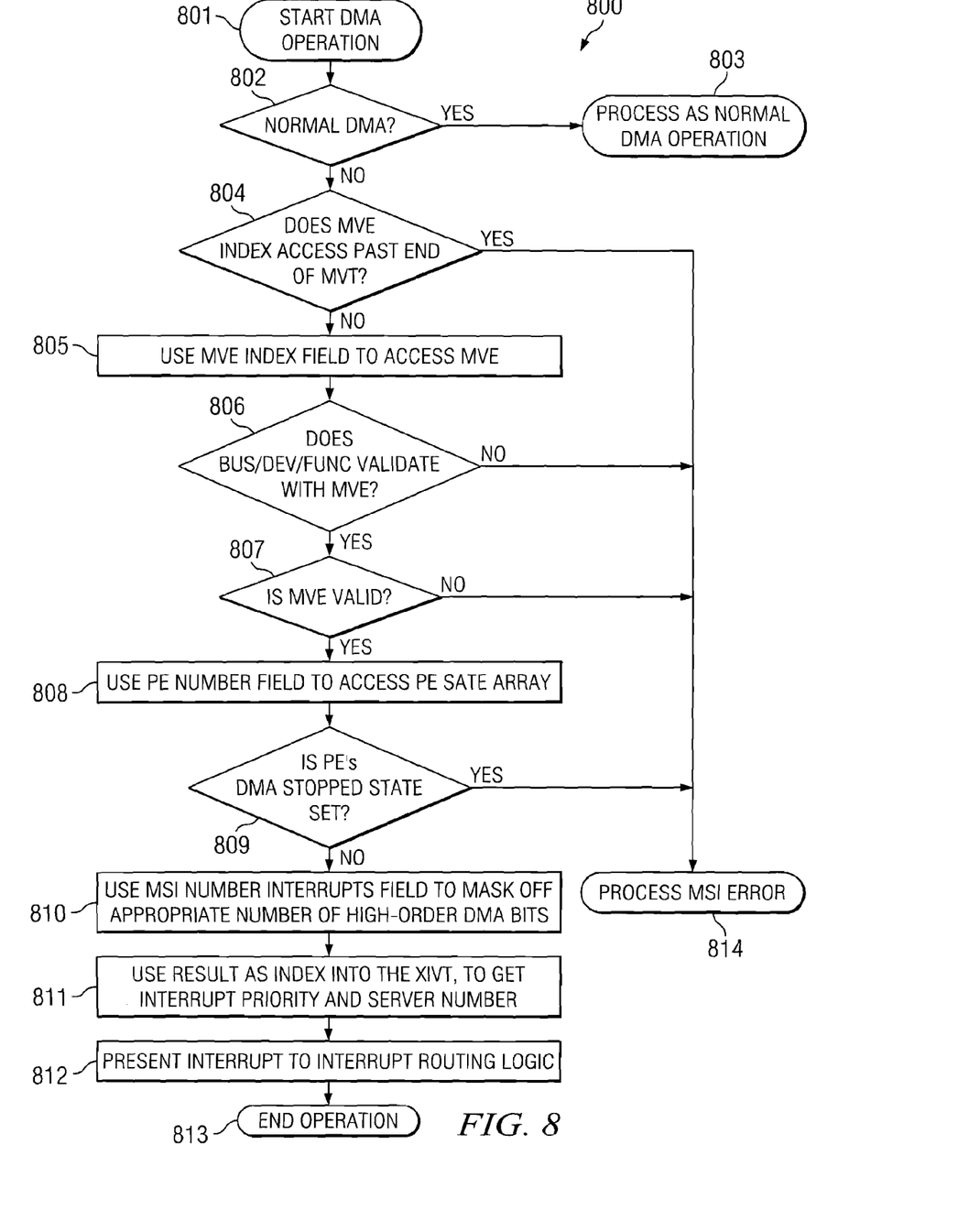
FIG. 8 a flowchart that illustrates a method for isolating input/output unit error domains in MSI/DMA operations in accordance with a preferred embodiment of the present invention.

FIG. 8 is a flowchart that illustrates a method for isolating input/output unit error domains in MSI operations in accordance with a preferred embodiment of the present invention. The method is generally designated by reference number 800, and begins with the start of a DMA operation (step 801).

A determination is made as to whether this is a DMA or an MSI (step 802). This determination is made, for example, by looking at a bit in the DMA address. A zero is a normal DMA operation and a one is an MSI operation. If it is a normal DMA operation (Yes output of step 802), it is processed as a DMA operation as described with reference to FIG. 7 (step 803)

If it is an MSI operation (No output of step 802), a determination is then made as to whether the MVE Index Field from bits in the I/O address will access beyond the end of the MVT (step 804). If it does (Yes output of step 804), error handling is performed (step 814) is performed. If not, (No output of step 804), the MVE Index is used to access MVE (step 805), and the Bus/Dev/Func fields of the MVE are used to determine if the PE Number (as specified by the Bus/Dev/Func # in the DMA operation) has access to MVE (step 806). If the Bus/Dev/Func number does not validate (No output of step 806), error handling is performed (step 814).

If the Bus/Dev/Func number does validate (Yes output of step 806), the MVE is then checked to see if it is valid (step 807). The MVE validity is verified by checking to make sure that the MCE Table Size (Address Size) field is non-zero. If the MVE is not valid (No output of step 807), then error handling is performed (step 814).

If the MVE is valid (Yes output of step 807), the PE Number field from the MVE is used to access the PE State Array (step 808). A determination is made as to whether or not the PE Number has its DMA Stopped State set (step 809). If not (No output of step 809), the method continues. If yes (Yes output of step 809), error handling is performed (step 814).

The MSI number Interrupts field of the MVE is used to mask off an appropriate number of high-order DMA data bits (to determine which data bits are valid), and the result is then ORed with the MSI Table Offset field of the MVE (that is, valid bits of the data are appended to the MSI Table Offset) (step 810). The result is then used as the index into the XIVT (eXternal Interrupt Vector Table containing XIVEs) to get the XIVE (eXternal Interrupt Vector Table Entry that provides the interrupt priority and server number for routing an interrupt, step 811).

The interrupt is then presented to the interrupt routing logic using the Server Number and Priority from the XIVE (step 812), and the MSI operation is complete (step 813).

Figure 9:
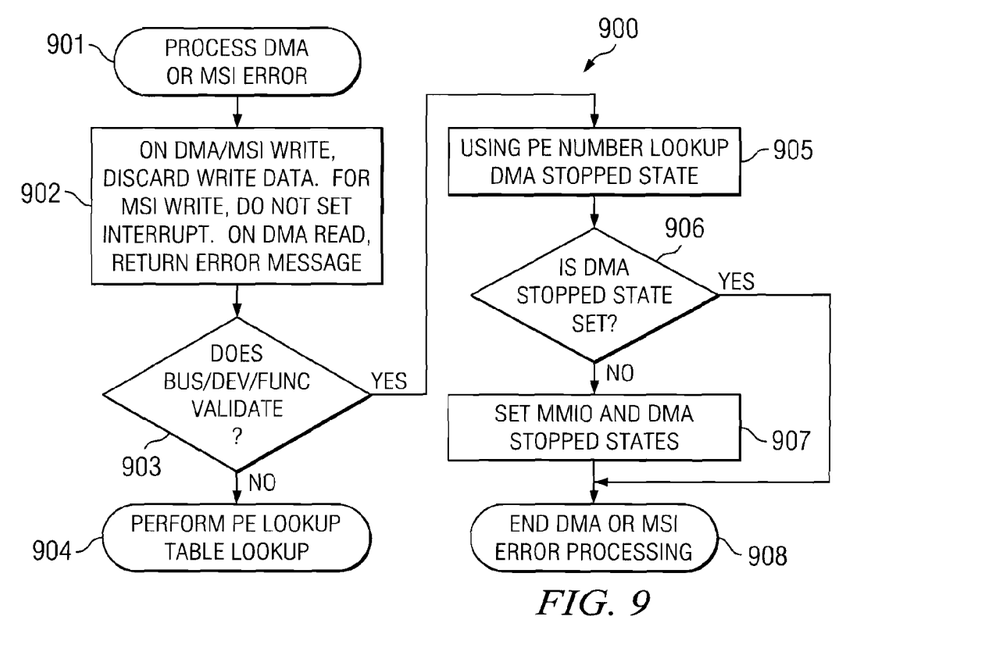
FIG. 9 is a flowchart that illustrates details of the step of processing a DMA error in the method illustrated in FIG. 7, and the step of processing an MSI error in the method illustrated in FIG. 8.

FIG. 9 is a flowchart that illustrates DMA/MSI error processing in accordance with a preferred embodiment of the present invention. In particular, FIG. 9 illustrates step 715 in FIG. 7 and step 814 in FIG. 8 in greater detail. The method is generally designated by reference number 900 and begins when error processing of a DMA or MSI operation is to be performed (step 901). If the operation in error is a DMA Write (Normal or MSI), then discard the write data, and for an MSI write do not report the interrupt, otherwise, for a DMA read, return an error message to the Requestor of the DMA Read Request (step 902).

A determination is then made if the Bus/Dev/Func number is validated in the TVE or MVE (step 903). If not (No output of step 903), a PELT lookup is done (step 904). Otherwise (Yes output of step 903), use the PE Number from the TVE or MVE to lookup the DMA Stopped State information for the PE in the PE State Array (step 905).

A determination is then made as to whether the DMA Stopped State is set for the given PE Number (step 906). If not set (No output of step 906), then set both the MMIO Stopped State and the DMA Stopped State for the PE Number (step 907) and the error processing is complete (step 908). Otherwise (Yes output from step 906), do not set the Stopped States and error processing is then complete (step 908).

Figure 10:
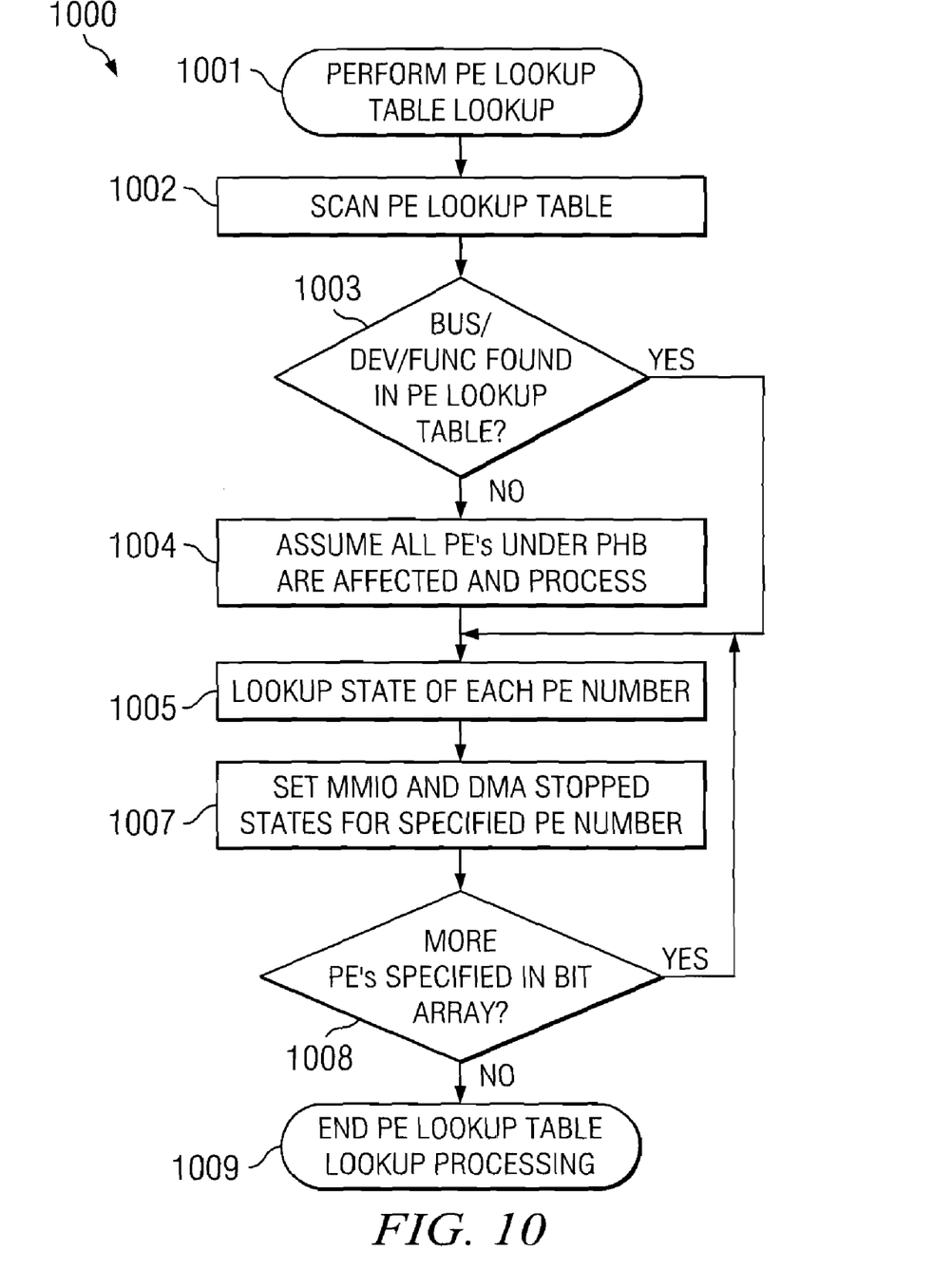
FIG. 10 is a flowchart that illustrates details of the step of performing a PELT lookup in the method illustrated in FIG. 9.

FIG. 10 is a flowchart that illustrates step 904 in FIG. 9 in greater detail. The method is generally designated by reference number 1000, and begins by performing a PELT lookup for a DMA or MSI error where the Bus/Dev/Func number did not validate in the TVE or the MVE, or due to an error from the fabric, either a fatal or a non-fatal error from the PCI-E fabric (step 1001). The PELT is scanned for an entry where the Bus/Dev/Func number matches the Bus/Dev/Func number from the I/O fabric (step 1002). This match may be an exact match, or some fields can be ignored by implementing the same Bus, Dev and Func validate fields in the PELT as previously described for the TVE.

If an entry with a matching Bus/Dev/Func number is not found (No output of step 1003), then it is assumed that all error domains for all PEs under the PHB are potentially affected and the method continues as though an entry was found in the PELT with all the PE bits set in the PE Bit Array (step 1004), or if an entry is found (Yes output of step 1003), lookup the state of each PE Number which is indicated in the PE Bit Array field of the matching PELT entry, in the PE State Array (step 1005). Both the MMIO Stopped State and the DMA Stopped State for the given PE number in the PE State Array are set (step 1007). Then make sure all PEs are processed (step 1008). If all PEs have been processed (No output of step 1008), the operation is complete (step 1009). If all PEs have not been processed (Yes output of step 1008), the operation returns to step 1005.

The present invention thus provides a method, apparatus and system for isolating input/output adapter error domains in a data processing system. Errors occurring in one input/output adapter are isolated from other input/output adapters by functionality in a host bridge that connects the plurality of input/output adapters to a system bus of the data processing system, thus permitting the use of low cost, industry standard switches and bridges external to the host bridge.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
a system bus;
a host bridge connected to the system bus, wherein the host bridge includes a table having a plurality of entries; and
a plurality of input/output units connected to the host bridge without a bridge chip located external of the host bridge for isolating errors in the plurality of input/output units from other components of the data processing system, wherein each input/output unit is identified by an identifier and each of the plurality of entries is capable of being assigned to a different input/output unit, wherein the host bridge includes functionality for isolating errors in the plurality of input/output units from other components of the data processing system using the identifier and the table to access an input/output unit State Array that indicates a state of an operation of the at least one of the plurality of input/output units.

2. The system according to claim 1, wherein the identifier of each input/output unit includes at least a Bus number field that identifies its respective input/output unit.

3. The system according to claim 2, wherein the identifier of at least one of the plurality of input/output units further includes a Device number field that identifies an input/output adapter included in the at least one of the plurality of input/output units.

4. The system according to claim 2, wherein the identifier of at least one of the plurality of input/output units further includes a Function number field that identifies a function of an input/output adapter included in the at least one of the plurality of input/output units.

5. The system according to claim 1, wherein the system further includes a memory connected to the system bus, and wherein the operation of the at least one of the plurality of input/output units comprises one of an MMIO operation, a normal DMA operation and an MSI operation.

6. The system according to claim 1, wherein the data processing system comprises a logical partitioned data processing system having a plurality of partitions, the one input/output unit being assigned to one of the plurality of partitions, and wherein the host bridge includes functionality for preventing an error in the at least one of the plurality of input/output units assigned to the one partition from affecting other partitions of the plurality of partitions of the logical partitioned data processing system.

7. The system according to claim 1, wherein at least one of the plurality of input/output units is connected to the host bridge through an input/output fabric.

8. An apparatus for isolating an error in one input/output unit of a data processing system from other components of the data processing system, comprising:

a host bridge for connecting a plurality of input/output units to a system bus without a bridge chip located external of the host bridge for isolating errors in the plurality of input/output units from other components of the data processing system, wherein the host bridge includes a table having a plurality of entries, each of the plurality of entries capable of being assigned to a different input/output unit of the plurality of input/output units, and wherein each of the plurality of input/output units includes an identifier, the host bridge including functionality for isolating an error in one of the plurality of input/output units from other components of the data processing system by using the identifier and the table to access an input/output unit State Array that indicates a state of an operation of the first one of the plurality of input/output units.

* * * * *